(12) United States Patent
Endo

(10) Patent No.: US 10,514,850 B2
(45) Date of Patent: Dec. 24, 2019

(54) INFORMATION PROCESSING SYSTEM, SERVER DEVICE, INFORMATION PROCESSING METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Kotaro Endo, Fuchu Tokyo (JP)

(73) Assignees: KABUSHIKI KAISHA TOSHIBA, Tokyo (JP); TOSHIBA SOLUTIONS CORPORATION, Kawasaki-shi (JP)

(*) Notice: Subject to any disclaimer, the term of this patent is extended or adjusted under 35 U.S.C. 154(b) by 496 days.

(21) Appl. No.: 15/058,410

(22) Filed: Mar. 2, 2016

(65) Prior Publication Data

US 2016/0179408 A1  Jun. 23, 2016

Related U.S. Application Data

(63) Continuation of application No. PCT/JP2013/073699, filed on Sep. 3, 2013.

(51) Int. Cl.
*G06F 3/06* (2006.01)
*H04L 29/08* (2006.01)

(52) U.S. Cl.
CPC ............ *G06F 3/0617* (2013.01); *G06F 3/065* (2013.01); *G06F 3/067* (2013.01); *G06F 3/0619* (2013.01);
(Continued)

(58) Field of Classification Search
CPC ...... G06F 3/0617; G06F 3/0619; G06F 3/065; G06F 3/0659; H04L 67/1097
(Continued)

(56) References Cited

U.S. PATENT DOCUMENTS

2007/0266027 A1* 11/2007 Gattegno ............ G06F 3/0605
2009/0228663 A1   9/2009 Ichino
(Continued)

FOREIGN PATENT DOCUMENTS

EP   0396834 A1 * 11/1990 ............... G06F 8/71
JP   09-190393   7/1997
(Continued)

OTHER PUBLICATIONS

Staffordshire University, Restoring Files using the "Previous Versions" facility in Windows XP, Feb. 2007, www.staffs.ac.uk, https://www.staffs.ac.uk/images/user195_shadow_copies_tcm68-25467.pdf.
*

(Continued)

*Primary Examiner* — Zi Ye
(74) *Attorney, Agent, or Firm* — Amin, Turocy & Watson, LLP

(57) ABSTRACT

According to an embodiment, an information processing system includes a server and a client. The server includes a storage, a receiver, and a storage controller. The storage is configured to store data and its version in a record indexed by a key for identifying the record. The receiver is configured to receive, from the client, a write request including write data, requested key for identifying a record where the write data is to be stored, and a write version that indicates a version of the write data. The storage controller is configured to replace the data and its version in the record identified by the requested key with the requested write data and the requested write version, respectively, if the version in the record identified by the requested key is smaller than the write version.

9 Claims, 10 Drawing Sheets

(52) U.S. Cl.
CPC ........ G06F 3/0659 (2013.01); H04L 67/1097 (2013.01)

(58) Field of Classification Search
USPC ........................................................ 709/202
See application file for complete search history.

(56) References Cited

U.S. PATENT DOCUMENTS

| | | | | |
|---|---|---|---|---|
| 2009/0327358 | A1* | 12/2009 | Lukiyanov | ........ G06F 17/30038 |
| 2012/0117120 | A1* | 5/2012 | Jacobson | .......... G06F 17/30557 |
| | | | | 707/793 |
| 2012/0284240 | A1 | 11/2012 | Vishniac et al. | |
| 2013/0066941 | A1* | 3/2013 | Kruse | .................... H04L 69/40 |
| | | | | 709/203 |
| 2013/0138646 | A1 | 5/2013 | Sirer et al. | |

FOREIGN PATENT DOCUMENTS

| | | |
|---|---|---|
| JP | 11-007403 | 1/1999 |
| JP | 2000-284998 | 10/2000 |
| JP | 2003-242016 | 8/2003 |
| JP | 2004-013867 | 1/2004 |
| JP | 2009-238197 | 10/2009 |

OTHER PUBLICATIONS

Wikipedia, Coprime integers, Sep. 4, 2012, en.wikipedia.org, http://web.archive.org/web/20120904125828/https://en.wikipedia.org/wiki/Coprime_integers.*
International Search Report for International Patent Application No. PCT/JP2013/703699 dated Dec. 10, 2013, 4 pages.
Written Opinion for International Patent Application No. PCT/JP2013/073699 dated Dec. 10, 2013, 3 pages.
International Search Report for International Patent Application No. PCT/JP2013/073699 dated Dec. 10, 2013, 3 pages.
International Search Report for International Patent Application No. PCT/JP2013/073699 dated Dec. 10, 2013, 4 pages

* cited by examiner

| KEY | DATA (VALUE) | VERSION |
|---|---|---|
| ⋮ | ⋮ | ⋮ |
| K | Va | Vs |
| ⋮ | ⋮ | ⋮ |

INFORMATION PROCESSING SYSTEM, SERVER DEVICE, INFORMATION PROCESSING METHOD, AND COMPUTER PROGRAM PRODUCT

CROSS-REFERENCE TO RELATED APPLICATION

This application is a continuation of PCT international application Ser. No. PCT/JP2013/073699 filed on Sep. 3, 2013, the entire contents of which are incorporated herein by reference.

FIELD

Embodiments described herein relate generally to an information processing system, a server device, an information processing method, and a computer program product.

BACKGROUND

A technology for maintaining consistency of data stored in an information processing system is known. As this technology, for example, there is a method for surely maintain the order of processes when data is updated.

Further, as one of the methods to store data, a key value store is known. In the key value store, data (value) is stored with a key to identify a record where the data is to be stored. In general, the key value store is used in a client server system, a cloud system or the like via a network. In other words, it is used in a system that includes a server device that stores data in the key value store and a client device that accesses to the key value store. The client device reads data in the key value store by specifying a key. Further, the client device updates the key value store using a pair of the key and the data (value).

However, it is difficult to maintain data consistency in the key value store, different from transactional database. For example, the key value store cannot arbitrate the order of simultaneous accesses from the client devices in parallel. Further, the key value store simply proceeds processes even when the order of access requests transmitted from the client devices is exchanged due to a delay or failure of a network.

DETAILED DESCRIPTION

According to an embodiment, an information processing system includes a server device and one or more client devices. The server device includes a storage, a receiver, and a storage controller. The storage is configured to store data and its version in a record indexed by identification information for identifying the record. The receiver is configured to receive, from the client device, a write request including write data that indicates data to be written to the storage, requested identification information for identifying a record where the write data is to be stored, and a write version that indicates a version of the write data. The storage controller is configured to replace the data and its version in the record identified by the requested identification information in the storage with the requested write data and the requested write version, respectively, if the version in the record identified by the requested identification information in the storage is smaller than the write version. The client device includes a transmitter configured to transmit the write request to the server device.

Hereinafter, an information processing system, an information processing method and a program according to an embodiment will be described with reference to the drawings.

First Embodiment

Figure 1:
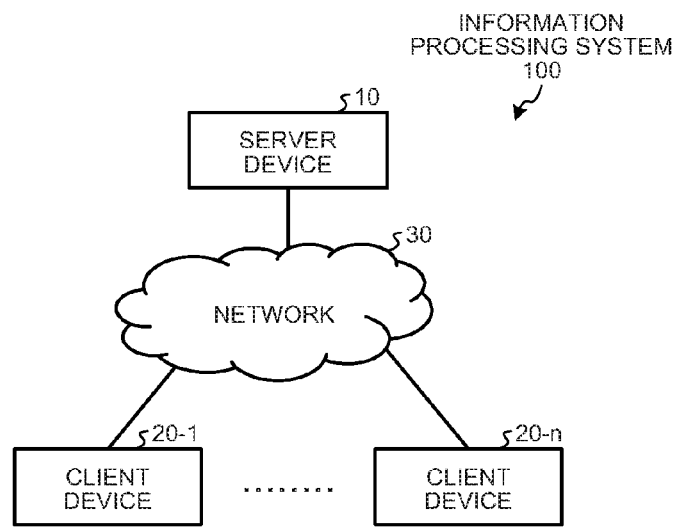
FIG. 1 is a diagram illustrating an example of a configuration of an information processing system according to a first embodiment.

FIG. 1 is a diagram illustrating an example of a configuration of an information processing system 100 according to a first embodiment. The information processing system 100 according to the present embodiment includes a server device 10, client devices 20-1 to 20-n ("n" is an integer equal to or greater than one), and a network 30. Hereinafter, when the client devices 20-1 to 20-n do not have to be distinguished, they will be simply denoted as a client device 20. The server device 10 and the client device 20 are connected via the network 30 so as to be able to communicate with each other. Here, the communication method between the server device 10 and the client device 20 may be wired, wireless, or a combination of wired and wireless methods.

Figure 2:
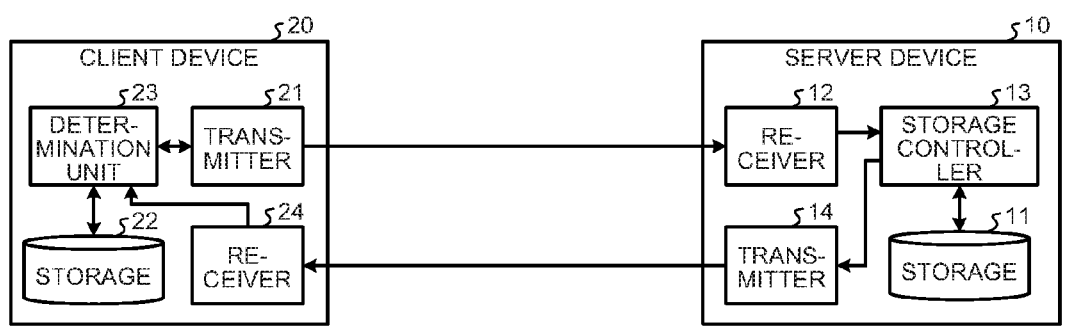
FIG. 2 is a diagram illustrating an example of configurations of a server device and a client device according to the first embodiment.

FIG. 2 is a diagram illustrating an example of configurations of the server device 10 and the client device 20 according to the first embodiment. The server device 10 according to the present embodiment includes a storage 11, a receiver 12, a storage controller 13 and a transmitter 14. The storage 11 stores data.

Figures 3, 4:
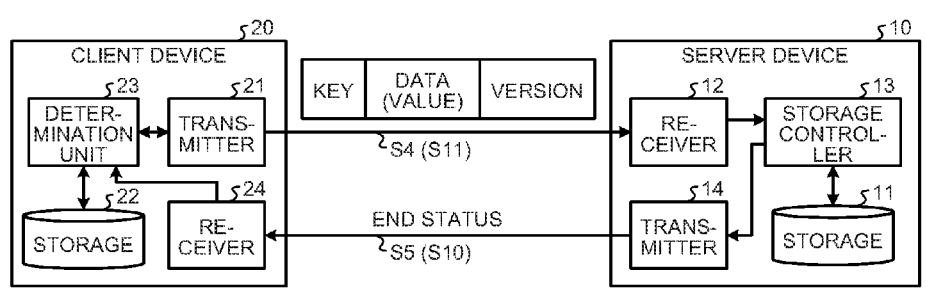
FIG. 3 is a diagram illustrating an example of a data configuration of a storage in the server device according to the first embodiment.
FIG. 4 is a diagram for explaining an example of data to be transmitted and received between the client device and the server device according to the first embodiment when writing data.

FIG. 3 is a diagram illustrating an example of a data structure of the storage 11 in the server device 10 according to the first embodiment. The storage 11 stores data (value), a key to identify a record where the data is to be stored, and a version of the data in the record. This key may be referred to as identification information.

Referring back to FIG. 2, when receiving a write request or a read request from the client device 20, the receiver 12 transmits the write request or the read request to the storage controller 13. The write request includes write data that indicates data to be written to the storage 11, a write key to identify a record where the write data is to be stored, and a write version that indicates a version of the write data. This write key may be referred to as requested identification information. The read request includes a read key to identify a record where the data to be read from the storage 11 is stored.

The storage controller 13 receives a write request or a read request from the receiver 12. When receiving a write request from the receiver 12, the storage controller 13 controls whether or not to store the write data to the storage 11 based on a result of comparing the write version with the version in the record identified by the write key in the storage 11. Then, the storage controller 13 transmits, to the transmitter 14, a completion status that indicates success or failure of the writing. Here, detailed description of the control by the storage controller 13 will be given later with reference to a flowchart of FIG. 6.

When receiving a read request from the receiver 12, the storage controller 13 reads data and its version in the record identified by the read key from the storage 11. The storage controller 13 generates response data including the data and its version and transmits the response data to the transmitter 14.

The transmitter 14 transmits the packet received from the storage controller 13 to the client device 20. The packet is either a completion status of the write request or response data (the data and its version) to the read request.

The client device 20 includes a transmitter 21, a storage 22, a determination unit 23 and a receiver 24. When receiving a read command including a read key from the determination unit 23, the transmitter 21 generates a read request including the read key and transmits the read request to the server device 10. The determination unit 23 is, for example, a function block formed by an application program that runs in the client device 20.

Further, when receiving a write command including a write version, a write key and write data from the determination unit 23, the transmitter 21 generates a write request including the write version, the write key and the write data. The transmitter 21 transmits the write request to the server device 10.

The storage 22 stores a current version for each write key. When a data write process is requested, the determination unit 23 generates a write command and transmits the write command to the transmitter 21. This write process may be requested in the determination unit 23 itself or may be requested from another function block which is not illustrated in FIG. 2. The determination unit 23 reads the current version from the storage 22 using the requested write key. The determination unit 23 determines a write version of the write request by adding a predetermined value to the curent version, and replace the current version with the determined write version in the storage 22.

For example, the predetermined value is one. Here, the predetermined value is not limited to one and can be any positive value. For example, a storing format of a version is an integer in 64 bits length, and an initial value of a version is zero. The determination unit 23 transmits a write command including the write key, the determined write version, and the write data to the transmitter 21.

Further, when a data read process is requested, the determination unit 23 generates a read command and transmits the read command to the transmitter 21. This read process may be requested in the determination unit 23 itself or may be requested from another function block which is not illustrated in FIG. 2.

The receiver 24 receives a completion status of a write request or response data of a read request from the server device 10. The received content is transmitted to the determination unit 23.

Figure 5:
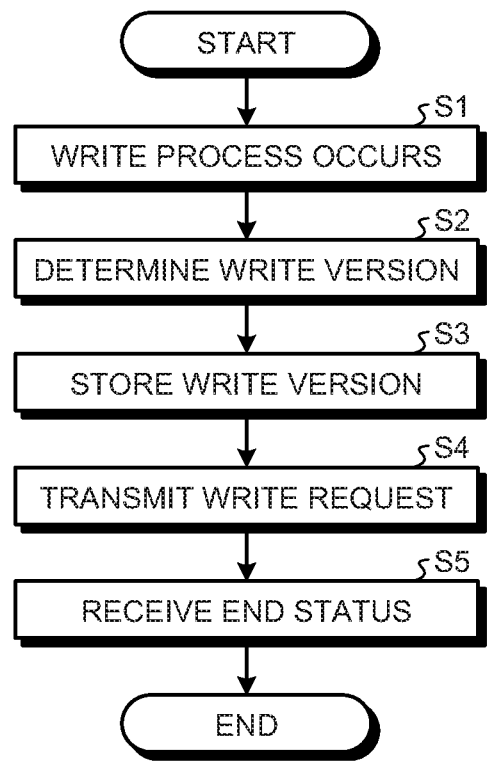
FIG. 5 is a flowchart illustrating an example of an operation when the client device according to the first embodiment writes data.
Figure 6:
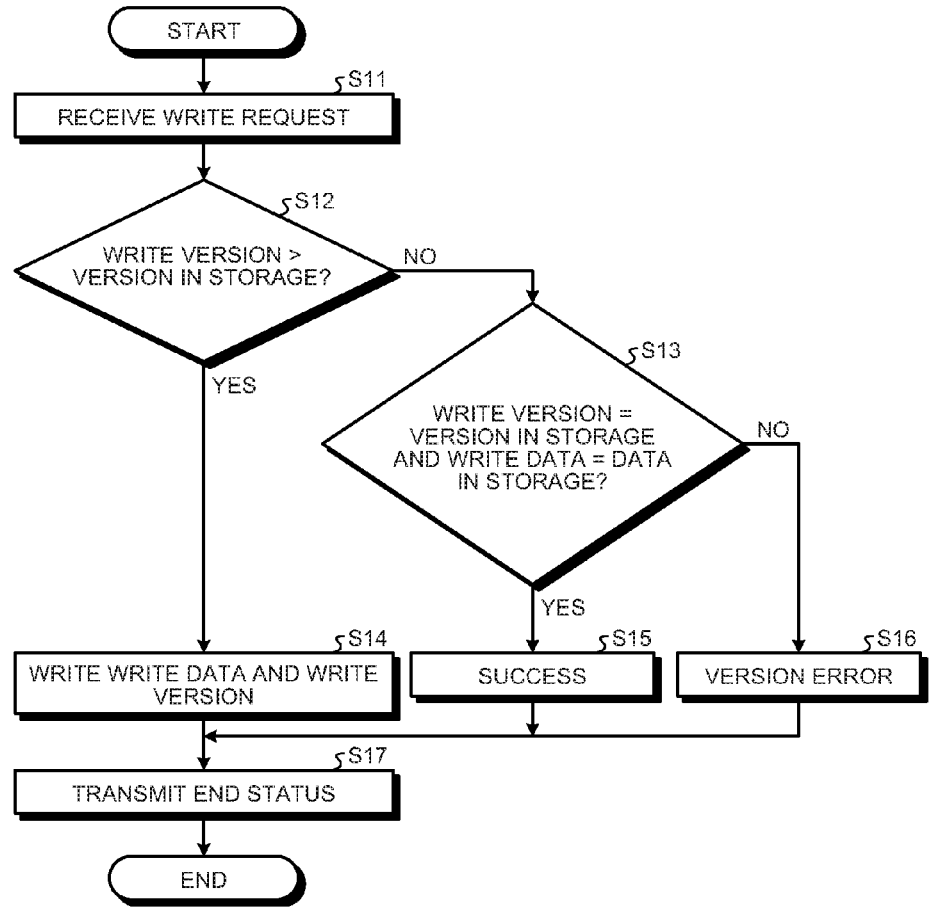
FIG. 6 is a flowchart illustrating an example of an operation when the server device according to the first embodiment receives a write request.

Next, an example of how the client device 20 according to the first embodiment writes data to the server device 10 will be described. FIG. 4 is a diagram for explaining data to be transmitted and received between the client device 20 and server device 10 according to the first embodiment when writing data. FIG. 5 is a flowchart illustrating an example of an operation of writing data by the client device 20 according to the first embodiment. FIG. 6 is a flowchart illustrating an example of an operation of receiving a write request by the server device 10 according to the first embodiment.

First, an operation by the client device 20 will be described with reference to FIGS. 4 and 5. A write process is requested in the determination unit 23 (step S1).

Next, the determination unit 23 reads a current version from the storage 22 by using a write key which is determined according to the write process. The determination unit 23 determines a write version of a write request to be transmitted by adding a predetermined value to the current version (step S2).

Next, the determination unit 23 transmits a write command including the write version, write key and write data to the transmitter 21. The determination unit 23 stores the determined write version to be the current version for the write key in the storage 22 (step S3).

Next, when receiving the write command including the write version, write key, and write data from the determination unit 23, the transmitter 21 transmits a write request including the write version, write key, and write data to the server device 10 (step S4). Next, the receiver 24 receives a completion status of the write request from the server device 10 (step S5). Here, when the receiver 24 has not received a completion status after a predetermined period of time, the transmitter 21 retransmits the write request.

Next, an operation of the server device 10 will be described with reference to FIGS. 4 and 6. The receiver 12 receives a write request from the client device 20 (step S11). The receiver 12 transmits the write request to the storage controller 13. The storage controller 13 receives the write request from the receiver 12.

Next, the storage controller 13 determines whether or not the version in the record identified by the write key in the storage 11 is smaller than the write version (step S12). When the version in the storage 11 is smaller than the write version (step S12, Yes), the data and its version in the storage 11 are rewritten with the write data and write version (step S14) and the process proceeds to step S17. When the version of the data in the storage 11 is equal to or greater than the write version (step S12, No), the process proceeds to step S13.

Next, the storage controller 13 determines whether or not the version and the data in the record identified by the write key both equal to the write version and the write data (step S13). When they are both equal respectively (step S13, Yes), it is considered that the writing is successful (step S15), and the process proceeds to step S17. In other words, in this case (step S13, Yes), the storage controller 13 considers that the write request is a retry (retransmission) and handles the process as success.

On the other hand, when one of them is not equal (step S13, No), since the write version included in the write request cannot be accepted, the storage controller 13 does not store the write data nor the write version in the storage 11 and determines to cause a version error (step S16), and the process proceeds to step S17.

Next, the storage controller 13 transmits a completion status that indicates success of writing (in a case of step S14 or step S15) or failure (in a case of step S16) to the client device 20 via the transmitter 14 (step S17).

Figure 7:
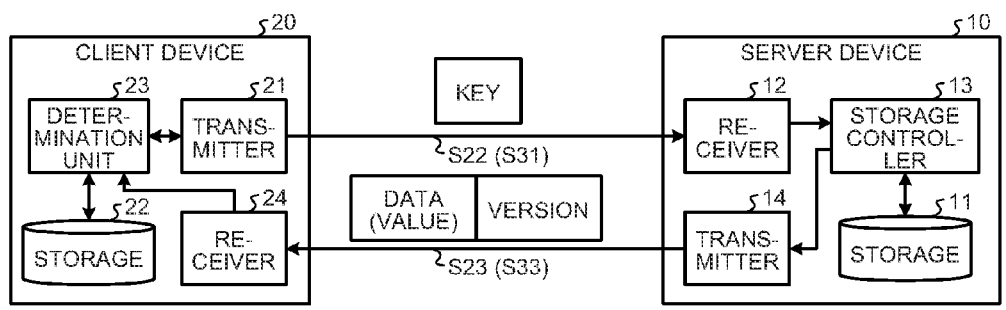
FIG. 7 is a diagram for explaining an example of data transmitted and received between the client device and the server device according to the first embodiment when reading data.
Figure 8:
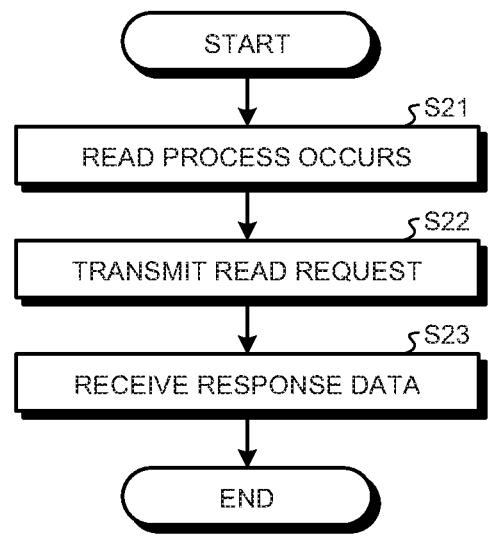
FIG. 8 is a flowchart illustrating an example of an operation when the client device according to the first embodiment reads data.
Figure 9:
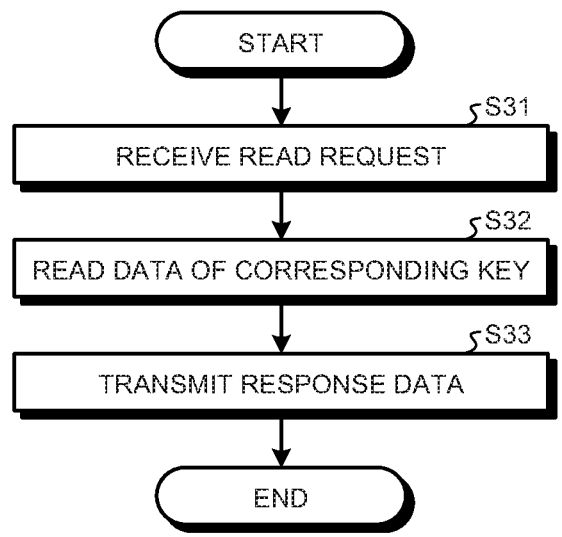
FIG. 9 is a flowchart illustrating an example of an operation when the server device according to the first embodiment receives a read request.

Next, an example of how the client device 20 according to the first embodiment reads data from the server device 10 will be described. FIG. 7 is a diagram for explaining an example of data to be transmitted and received between the client device 20 and the server device 10 according to the first embodiment when reading data. FIG. 8 is a flowchart illustrating an example of an operation to read data by the client device 20 according to the first embodiment. FIG. 9 is a flowchart illustrating an example of an operation when the server device 10 according to the first embodiment receives a read request.

Firstly, an operation of the client device 20 will be described with reference to FIGS. 7 and 8. A read process occurs in the determination unit 23 of the client device 20 (step S21). Next, the transmitter 21 receives, from the determination unit 23, a read key which is determined according to the read process and transmits a read request including the read key to the server device 10 (step S22). Then, the receiver 24 receives response data from the server device 10 in response to the read request (step S23). The response data includes data and its version read from the storage 11 in the server device 10.

Next, an operation of the server device 10 will be described with reference to FIGS. 7 and 9. The receiver 12 receives a read request from the client device 20 (step S31). The receiver 12 transmits the read request to the storage controller 13. The storage controller 13 receives the read request from the receiver 12. Then, the storage controller 13 reads data and its version in the record identified by the read key from the storage 11 (step S32). The storage controller 13 generates response data including the data and its version.

Next, the storage controller 13 transmits the response data to the client device 20 via the transmitter 14 (step S33).

Next, effect of an information processing method of the information processing system 100 according to the present embodiment will be described. For example, the information processing method according to the present embodiment can prevent inconsistency between the state of the storage 11 of the server device 10 and write processes by the client device 20 from occurring in a case of the following Scenario 1. Here, in the following example, the predetermined value to be added to a version by the determination unit 23 is one.

Scenario 1

1. The client device 20 transmits a write request A (key K, data A, version V) to the server device 10.
2. The server device 10 does not receive yet the write request A due to a delay of the network 30 or the like.
3. Since the client device 20 does not receive any completion status from the server device 10 within a predetermined period of time after transmitting the write request A, this causes a time out of the process of transmitting the write request A.
4. The client device 20 transmits a write request A' (key K, data A, version V) to the server device 10 (retransmission of the write request A).
5. The server device 10 receives the write request A' first and executes a write process. The content of the storage 11 becomes (key K, data A, version V).
6. The client device 20 transmits a write request B (key K, data B, version V+1) to the server device 10.
7. The server device 10 receives the write request B and executes a write process. The content of the storage 11 becomes (key K, data B, version V+1).
8. Even when the write request A (key K, data A, version V) that has been delayed is received, the server device 10 does not execute the write process of the write request A since the version of the write request is smaller than the version V+1 in the storage 11.

As described above, the information processing system 100 according to the present embodiment can prevent inconsistency between the state of the storage 11 in the server device 10 and the write processes by the client device 20 from occurring even when the quality of the network 30 is not high and a delay and a loss of a write request is likely to occur. For example, with the information processing system 100 according to the present embodiment, the data B in the storage 11 updated based on the write request B is never overwritten with the write request A even when the server device 10 receives the write request A and the write request B in a reverse reception order. Thus, inconsistency between the state of the storage 11 in the server device 10 and the write process by the client device 20 can be prevented from occurring.

Here, in the information processing system 100 according to the present embodiment, the number of the client devices 20 is n (n is an integer equal to or greater than one), and the storage 22 of each client device 20 stores a write version for each write key. Thus, when there is more than one client device 20 that updates the data having a same key, the client devices 20 may synchronize the content of the storage 22 by informing the number of the used version to one another. For example, before transmitting a write request, the client device 20 informs a write key and a version used for the write key to other client devices 20 that update data of the same key.

Further, the predetermined number to be added when the determination units 23 of the plurality of client devices 20 determine a version may be varied in each client device 20.

For example, the predetermined number that the determination units 23 of the plurality of client devices 20 add may be relatively prime integers. With this configuration, the version can be used to identify a client device 20 that has updated data in the storage 11 in the server device 10 for example.

Second Embodiment

Next, an information processing system 100 according to a second embodiment will be described. Since a configuration of the information processing system 100 according to the present embodiment is the same as the configuration of the information processing system 100 according to the first embodiment (see FIG. 1), the explanation thereof will be omitted. The information processing system 100 according to the present embodiment is different from the information processing system 100 according to the first embodiment on that the client device 20 does not store a version. Further, the operation that the client device 20 writes data to the server device 10 is different from the operation in the first embodiment. Here, since the operation that client device 20 reads data from the server device 10 is the same as the operation in the first embodiment, the explanation thereof will be omitted.

Figure 10:
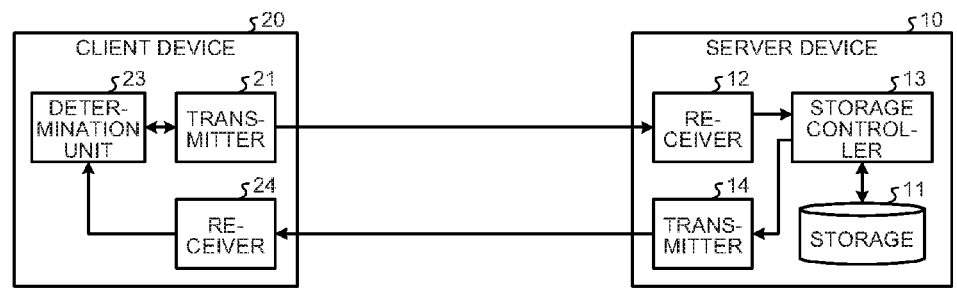
FIG. 10 is a diagram illustrating an example of configurations of a server device and a client device according to a second embodiment.

FIG. 10 is a diagram illustrating an example of configurations of the server device 10 and the client device 20 according to the second embodiment. Since the configuration of the server device 10 according to the present embodiment is the same as the configuration of the server device 10 according to the first embodiment, the explanation thereof will be omitted. The configuration of the client device 20 according to the present embodiment is different from the configuration of the client device 20 according to the first embodiment on that the storage 22 is not included.

Figure 11:
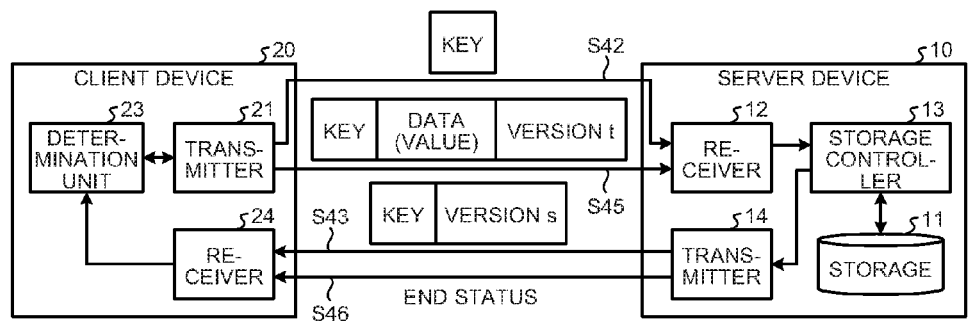
FIG. 11 is a diagram illustrating an example of data transmitted and received between the client device and the server device according to the second embodiment when writing data.
Figure 12:
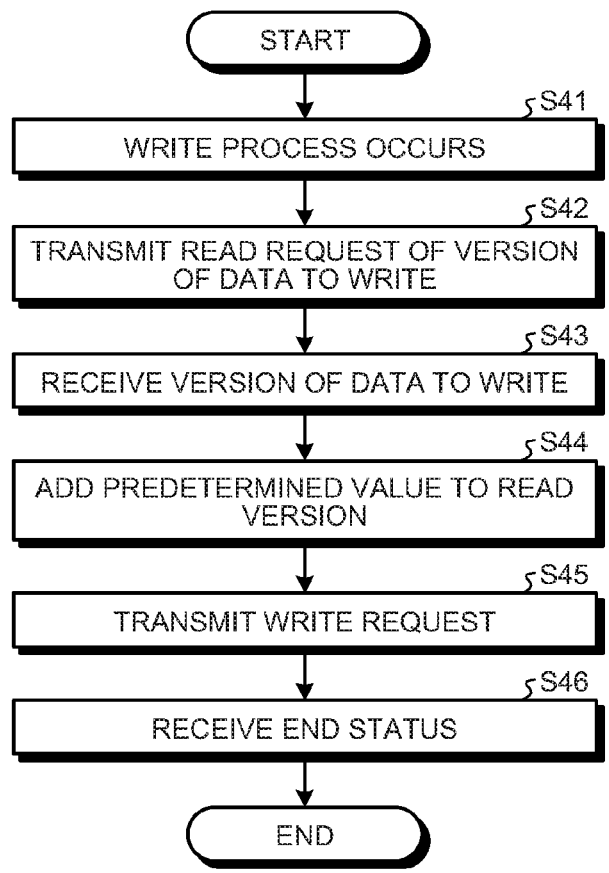
FIG. 12 is a flowchart illustrating an example of an operation when the client device according to the second embodiment writes data.

An example of a method that the client device 20 according to the second embodiment writes data to the server device 10 will be described. FIG. 11 is a diagram for explaining an example of data to be transmitted and received between the client device 20 and the server device 10 according to the second embodiment when writing data. FIG. 12 is a flowchart illustrating an example of an operation when the client device 20 according to the second embodiment writes data. Here, since the operation that the server device 10 according to the present embodiment receives a write request is the same as the operation by the server device 10 according to the first embodiment, the explanation thereof will be omitted.

A write process occurs in the determination unit 23 of the client device 20 (step S41). Next, to read a version associated with a write key which is determined based on the write command, the transmitter 21 transmits a read request including the write key to the server device 10 (step S42). Then, the receiver 24 receives response data including the write key and a version s associated with the write key from the server device 10 (step S43).

The receiver 24 transmits the response data to the determination unit 23. Next, when receiving the response data from the receiver 24, the determination unit 23 determines a write version t by adding a predetermined number to the version s included in the response data (step S44). The determination unit 23 transmits the write key, the write data, and the version t to the transmitter 21. Next, the transmitter 21 transmits a write request including the write key, write data and version t of the write data to the server device 10 (step S45). Then, the receiver 24 receives a completion status of the write request from the server device 10 (step S46).

With the information processing system 100 according to the present embodiment, inconsistency between the state of the storage 11 of the server device 10 and the write processes of the client device 20 can be prevented from occurring even when the client device 20 does not include the storage 22 that stores the version.

Here, when retrying transmission of a write request in a case where a completion status is not received from the server device 10 within a predetermined period of time for example, the transmitter 21 of the client device 20 transmits a write request having a same content with the transmitted write request (transmits with the same version) without executing the above process in step S42.

Third Embodiment

Figure 13:
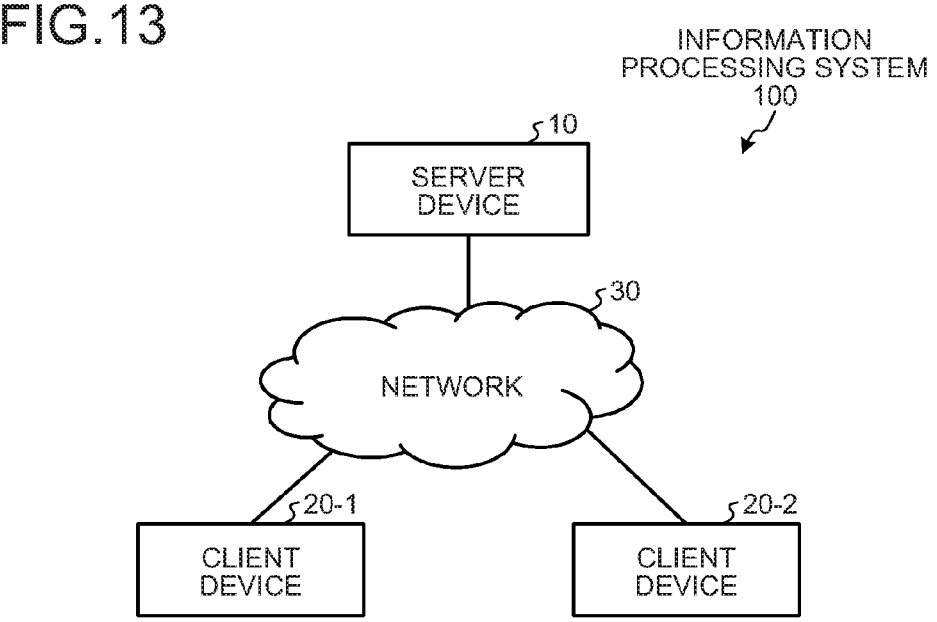
FIG. 13 is a diagram illustrating an example of a configuration of an information processing system according to a third embodiment.

Next, an information processing system 100 according to a third embodiment will be described. FIG. 13 is a diagram illustrating an example of a configuration of the information processing system 100 according to the third embodiment. The information processing system 100 according to the present embodiment includes a server device 10, a client device 20-1, a client device 20-2, and a network 30. The server device 10, the client device 20-1, and the client device 20-2 are connected via the network 30 so as to communicate with one another. The information processing system 100 according to the present embodiment is a redundant system that includes the client device 20-1 serving as an active system and the client device 20-2 serving as a standby system. In other words, when failure occurs in the active client device 20-1, a fail-over (system switch) is executed from the active client device 20-1 to the standby client device 20-2.

Figure 14:
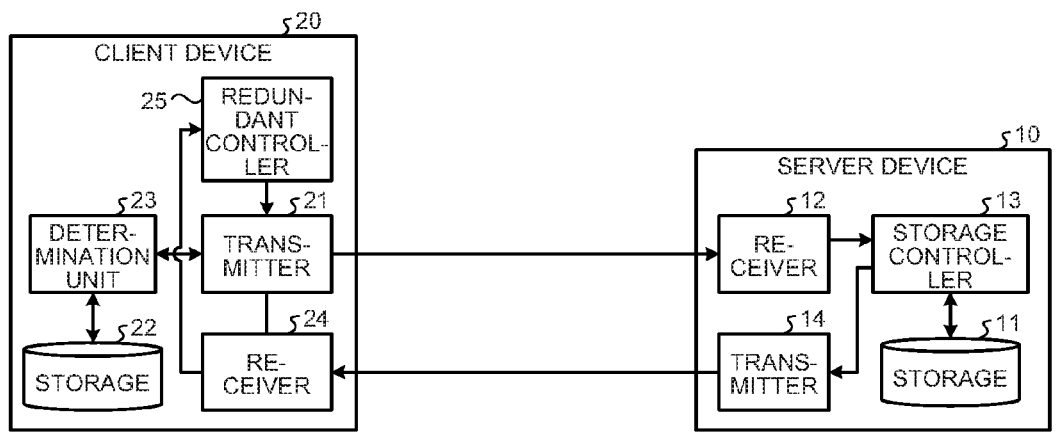
FIG. 14 is a diagram illustrating an example of configurations of a server device and a client device according to the third embodiment.

FIG. 14 is a diagram illustrating an example of a configuration of the server device 10 and the client device 20 according to the third embodiment. Since the configuration of the server device 10 according to the present embodiment is the same as that of the first embodiment, the explanation thereof will be omitted. The client device 20 according to the present embodiment includes a transmitter 21, a storage 22, a determination unit 23, a receiver 24 and a redundant controller 25. In the configuration of the client device 20 according to the present embodiment, the redundant controller 25 is added to the configuration of the client device 20 according to the first embodiment. Since the transmitter 21, the storage 22, the determination unit 23 and the receiver 24 are the same as those of the client device 20 according to the first embodiment, the explanation thereof will be omitted.

A redundant controller 25-1 of the active client device 20-1 periodically transmits a signal that indicates that the client device 20-1 is operating properly (hereinafter, referred to a "heartbeat signal") to a redundant controller 25-2 of the standby client device 20-2 via the network 30. When a heartbeat signal cannot be received within a predetermined period of time, the standby redundant controller 25-2 detects that failure has occurred in the active client device 20-1. When detecting that failure has occurred in the active client device 20-1, the standby redundant controller 25-2 executes a fail-over (system switch).

Figure 15:
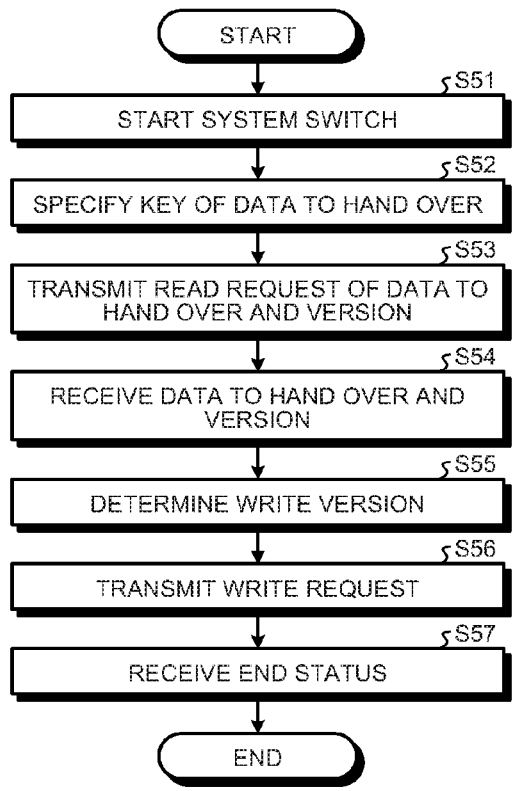
FIG. 15 is a flowchart illustrating an example of an operation when a fail-over (system switch) occurs in the information processing system according to the third embodiment.

FIG. 15 is a flowchart illustrating an example of an operation when a fail-over (system switch) occurs in the information processing system according to the third embodiment. Here, the flowchart of FIG. 15 describes only a fail-over process related to data modification in the server device 10. The standby redundant controller 25-2 detects failure in the active client device 20-1 and starts an operation for a fail-over (system switch) (step S51). Next, the standby redundant controller 25-2 identifies keys of data to take over (step S52).

For all the keys to take over, controller 25-2 repeats following recovery procedure.

To read the data and version associated with the key, the transmitter 21 transmits a read request including the key to the server device 10 (step S53). Next, the receiver 24 receives the response data including the data and its version associated with the key from the server device 10 (step S54).

The receiver 24 transmits the response data to the determination unit 23. Then, when receiving the response data from the receiver 24, the determination unit 23 determines a write version by adding a predetermined number to the version included in the response data (step S55). The determination unit 23 transmits the write key, the data, and the version to the transmitter 21. Then, the transmitter 21 transmits the write request including the write key, the write data and the version of the write data to the server device 10 (step S56). In other words, the same data is written back by changing only the version. Then, the receiver 24 receives a completion status of the write request from the server device 10 (step S57).

Next, effect of the information processing method of the information processing system 100 according to the present embodiment will be described. For example, when a fail-over (system switch) occurs, the information processing method according to the present embodiment can prevent inconsistency between the state of the storage 11 of the server device 10 and the write processes by the client device 20 from occurring. The following will be described with Scenario 2 as an example. Here, in the following example, the predetermined number to be added to the version by the determination unit 23 is assumed to be one.

Scenario 2
1. The active client device 20-1 transmits a write request A (key K, data A, version V) to the server device 10.
2. The server device 10 does not receive yet the write request A due to a delay of the network 30 or the like.
3. The standby client device 20-2 detects failure in the active client device 20-1 and a fail-over (system switch) is performed. In other words, the client device 20-2 becomes an active system.
4. The active client device 20-2 reads, from the server device 10, a version (V−1) of a key K and data B which is to be handed over. At this point, the content of the storage 11 is (key K, data B, version V−1).
5. The active client device 20-2 transmits a write request B (key K, data B, version V) to the server device 10.
6. The server device 10 receives the write request B and executes the write process. The content of the storage 11 becomes (key K, data B, version V).
7. Even when the write request A (key K, data A, version V) which has been delayed is received, the server device 10 does not execute the write process for the write request A since the version V of the key K of the storage 11 is equal to the version V of the write request A and data (A) of the key K of the storage 11 is not equal to data (B) of the write request A, and this causes a version error.

Further, the information processing method according to the embodiment is effective for a case where a split-brain occurs. A split-brain is a situation that the client device 20-2 determines that failure has occurred in the active client device 20-1 even when the active client device 20-1 is operating properly, since heartbeat signals are not sent to the standby client device 20-2 due to failure of the network or the like. This causes a problem that two active client devices operate at the same time in an unintended manner. An effect of the information processing method according to the present embodiment in a case where a split-brain has occurred will be described with reference to the following Scenario 3 as an example. Here, in the following example, the predetermined number to be added to the version by the determination unit 23 is assumed to be one.

Scenario 3
1. A split-brain occurs.
2. The standby client device 20-2 detects failure of the active client device 20-1 and the client device 20-2 serves as an active system.
3. The active client device 20-2 reads the version (V−1) of the key K and data B to be handed over from the server device 10. At this point, the content of the storage 11 is (key K, data B, version V−1).
4. The active client device 20-2 transmits a write request B (key K, data B, version V) to the server device 10.
5. The server device 10 receives the write request B and executes a write process. The content of the storage 11 becomes (key K, data B, version V).
6. The previous active client device 20-1 transmits a write request A (key K, data A, version V) to the server device 10.
7. Even when the write request A (key K, data A, version V) is received, the server device 10 does not execute the write process for the write request A (this is called "fence off") since the version V of the key K of the storage 11 is equal to the version V of the write request A and data (B) of the key K of the storage 11 is not equal to data (A) of the write request A and this causes a version error.
8. Upon receiving a completion status including information that indicates a version error from the server device 10, the active client device 20-1 detects that the client device 20-2 switches to be an active system.
9. The active client device 20-1 voluntarily switches to be a standby system.

As described above, the information processing system 100 according to the present embodiment can prevent inconsistency between the state of the storage 11 of the server device 10 and the write processes by the client device 20 from occurring even when a system switch of the client devices 20, a split-brain or the like occurs.

Here, in the above process of step S55, the determination unit 23 may determine a write version by adding a number which is sufficiently greater than the predetermined number to the version included in the response data. With this configuration, the information processing method according to the present embodiment is effective for a system switch or a split-brain that occurs in a case such that the client device 20-1 repeats updating same data as increasing the version, for example. Here, the value which is sufficiently greater than the predetermined number is, for example, assumed to be a value greater than a product of (an assumed number of the data updates before the system switch by the client device 20 during the system switch process) and (predetermined number).

Fourth Embodiment

Next, an information processing system 100 according to a fourth embodiment will be described. Since the configuration of the information processing system 100 according to the present embodiment is the same as the configuration of the information processing system 100 according to the first embodiment (see FIG. 1), the explanation thereof will be omitted. Here, the number n of the client devices 20 is an integer which is equal to or greater than two.

Figure 16:
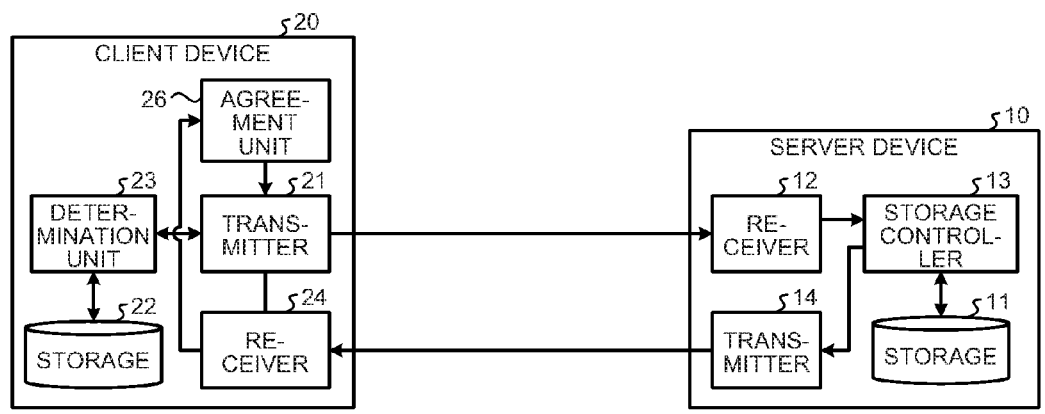
FIG. 16 is a diagram illustrating an example of configurations of a server device and a client device according to a fourth embodiment.

FIG. 16 is a diagram illustrating an example of configurations of a server device 10 and the client device 20 according to the fourth embodiment. Since the configuration of the server device 10 according to the present embodiment is the same as the configuration of the server device 10 according to the first embodiment, the explanations thereof will be omitted. The client device 20 according to the present embodiment includes a transmitter 21, a storage 22, a determination unit 23, a receiver 24 and an agreement unit 26. The information processing system 100 according to the present embodiment is different from the information processing system 100 according to the first embodiment on that the client device 20 further includes the agreement unit 26. Since the transmitter 21, the storage 22, the determination unit 23 and the receiver 24 are the same as those in the client device 20 according to the first embodiment, the explanation thereof will be omitted.

When an agreement command is received from another function block which is not illustrated in FIG. 16, the agreement unit 26 creates an agreement request and transmits the agreement request to the server device 10. The agreement command is a command to obtain an agreement of data to be written to the server device 10 among a plurality of the client devices 20. The agreement request is a write request including data to be agreed, a write version which is the same in the plurality of client devices 20, and a write key which is the same in the plurality of client devices.

After transmitting the agreement request, the agreement unit 26 transmits a read request including a read key which is the same as the write key included in the agreement request to the server device 10 via the transmitter 21. For example, after receiving the response data including a completion status of the agreement request from the server device 10, the agreement unit 26 transmits the read request. The agreement unit 26 receives the response data of the read request from the server device 10 via the receiver 24 and obtains an agreement using the data included in the response data.

Figure 17:
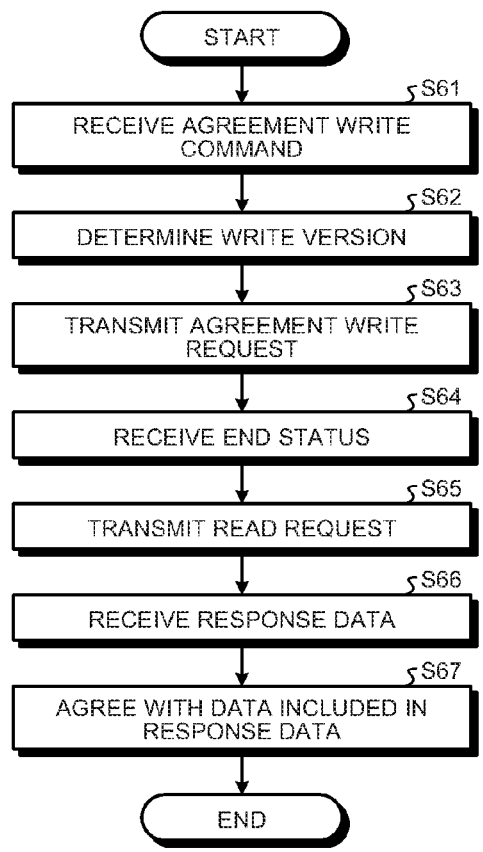
FIG. 17 is a flowchart illustrating an example of an operation when the client device according to the fourth embodiment obtains an agreement of data.

FIG. 17 is a flowchart illustrating an example of an operation when the client device 20 according to the fourth embodiment obtains an agreement of data. The agreement unit 26 receives an agreement write command from another function block generated by an application program of the client device 20 (step S61). Next, the agreement unit 26 determines a write version to be used in an agreement write request (step S62). The write version is a value which is the same in the plurality of client devices 20. Here, for the version used in the agreement write request, for example, a value which is previously reserved in each client device 20 may be used.

Next, the agreement unit 26 creates an agreement write request including data to be agreed, a write version which is the same in the plurality of client devices 20, a write key which is the same in the plurality of the client devices and transmits the agreement write request to the server device 10 (step S63). Then, the agreement unit 26 receives a completion status of the agreement write request from the server device 10 via the receiver 24 (step S64). Then, the agreement unit 26 transmits a read request including a read key which is the same as the write key included in the agreement write request to the server device 10 via the transmitter 21 (step S65). Then, the agreement unit 26 receives response data for the read request from the server device 10 via the receiver 24 (step S66). Then, the agreement unit 26 reaches an agreement using the data included in the response data (step S67).

As described above, in the information processing system 100 according to the present embodiment, since the client device 20 includes the agreement unit 26, an agreement of data to be written to the server device 10 between the plurality of client devices 20 can be obtained.

Here, in the above described process of step S64, since the agreement unit 26 can see a value of an end status (success or failure of writing), it can determine whether or not a transmission of the read request (step S65) is necessary. In other words, when the writing has been successful, the processes in steps S65 to S67 can be omitted since it is indicated that the write data transmitted from the device itself has been written (that the agreement has been obtained using the write data transmitted from the device).

The information processing method according to the present embodiment can be used, for example, in an agreement problem such as a leader election and an atomic broadcast in a distributed system. Further, the information processing method according to the present embodiment can obtain an agreement regardless of any stop failure in another client device 20. In other words, the information processing method according to the present embodiment can reach an agreement even when another client device 20 stops.

Figure 18:
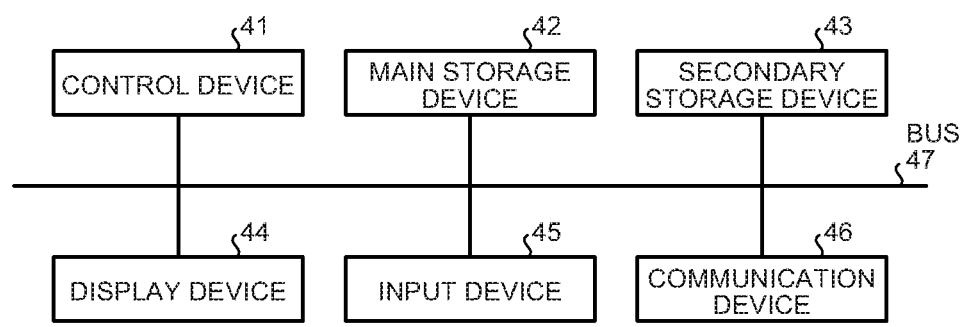
FIG. 18 is a diagram illustrating an example of hardware configurations of the server device and the client device according to the first to fourth embodiments.

Last of all, hardware configurations of the server device 10 and the client device 20 according to the first to fourth embodiments will be described. FIG. 18 is a diagram illustrating an example of hardware configurations of the server device 10 and the client device 20 according to the first to fourth embodiments.

The server device 10 and the client device 20 according to the first to fourth embodiments include a control device 41, a main storage device 42, a secondary storage device 43, a display device 44, an input device 45 and a communication device 46. The control device 41, the main storage device 42, the secondary storage device 43, the display device 44, the input device 45 and the communication device 46 are connected to one another via a bus 47.

The control device 41 executes a program read by the main storage device 42 from the secondary storage device 43. The main storage device 42 is a memory such as a ROM (Read Only Memory), a RAM (Random Access Memory), or the like. The secondary storage device 43 is, for example, a hard disk, a memory card, or the like. The display device 44 is a screen that displays states or the like of the server device 10 and the client device 20. The display device 44 is, for example, a liquid crystal display, or the like. The input device 45 is an interface to operate the server device 10 and the client device 20. The input device 45 is, for example, a keyboard, a mouse, or the like. The communication device 46 is an interface to connect to a network.

The program to be executed in the server device 10 and the client device 20 according to the present embodiment may be recorded to a record medium, which can be read by a computer, such as a CD-ROM, a memory card, a CD-R or a DVD (Digital Versatile Disk) as a file in a record medium format and in an executable format and provided as a computer program product. Further, the program executed in the server device 10 and the client device 20 according to the present embodiment may be stored in a computer connected to a network such as the Internet or the like and provided by allowing downloading via the network. Further, the program executed in the server device 10 and the client device 20 according to the present embodiment may be provided or distributed via a network such as the Internet or the like without allowing downloading. Further, the program of the server device 10 and the client device 20 according to the present embodiment may be provided by installing to a ROM or the like in advance.

The program to be executed by the server device 10 according to the present embodiment has a module configuration including function blocks that can also be realized as a program (receiver 12, storage controller 13 and transmitter 14) among the above described respective function blocks of the server device 10.

Further, the program to be executed in the client device 20 according to the present embodiment has a module configuration including function blocks that can also be realized as a program (transmitter 21, determination unit 23, receiver 24, redundant controller 25 and agreement unit 26) among the above described respective function blocks of the client device 20.

Regarding the module as an actual hardware, when the control device 41 reads the program from the above described storage medium and executes the program, the respective modules are loaded in the main storage device 42. In other words, the above described respective modules are generated in the main storage device 42. Here, a part or all of the respective function blocks of the server device 10 and the client device 20 may be realized by hardware such as an IC (Integrated Circuit) without realizing with the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
a server device; and
a plurality of client devices, wherein
the server device comprises first storage configured to store data and its version in a record indexed by identification information for identifying the record;
a receiver configured to receive, from a client device of the plurality of client devices, a write request including write data that indicates data to be written to the first storage, requested identification information for identifying a record where the write data is to be stored, and a write version that indicates a version of the write data; and
a storage controller configured to replace the data and its version in the record identified by the requested identification information in the first storage with the requested write data and the requested write version, respectively, if the version in the record identified by the requested identification information is smaller than the requested write version, and
the client device comprises:
a determination unit, implemented by computer hardware, configured to determine a current version;
a second storage configured to store the current version determined by the determination unit for respective identification information:
the determination unit to determine the current version for respective identification information on the client device is varied from other client devices by comparing the current version for respective identification information to the version for respective identification information on other client devices before transmitting the write request; and
based on the determination of the current version for respective identification information on the client device is varied from other client devices, a transmitter configured to transmit the write request to the server device, wherein
the determination unit determines the write version of the write request to be transmitted by adding a predetermined number to the current version stored in the second storage when transmitting the write request to the server device, and replaces the current version with the determined write version in the second storage, and
a predetermined number added by the determination unit in one of the plurality of client devices and a predetermined number added by the determination unit in another one of the plurality of client devices are mutually different values and relatively prime integers.

2. The system according to claim 1, wherein
when the version in the record identified by the requested identification information is greater than the write version, the storage controller transmits, to the client device, error information indicating that the data in the record identified by the requested identification information cannot be replaced with the write data.

3. The system according to claim 1, wherein
when the version in the record identified by the requested identification information equals to the write version, and the data in the record identified by the requested identification information is not equal to the write data, the storage controller transmits, to the client device, error information indicating that the data in the record identified by the requested identification information cannot be replaced with the write data.

4. The system according to claim 1, wherein
the plurality of client devices include a first client device as an active system and a second client device as a standby system, and
when the second client device takes over the first client, the determination unit of the second client device acquires the data and its version by sending a read request to the server and receiving a response, and sends a write request including the acquired data and a write version made by adding a value greater than the predetermined number to the acquired version, and stores the write version as a current version.

5. The system according to claim 1, wherein
before the write request is transmitted, the determination unit, implemented by the computer hardware, is configured to, send a read request, and receives a response, and finally send the write request including the write version by adding a predetermined number to the received version.

6. The system according to claim 1, wherein
each client device further comprises
an agreement unit, implemented by the computer hardware, configured to previously transmit, to the server device, an agreement request as a write request that includes data to obtain an agreement, the write version which is the same in the plurality of client devices, and the identification information which is the same in the plurality of client devices, transmit, to the server device, a read request including the identification information included in the agreement request, and obtain an agreement using the read data.

7. A server device connected to a plurality of client devices, the server device comprising:
- a first storage configured to store data and its version in a record indexed by identification information for identifying the record;
- a receiver configured to receive, from a client device of the plurality of client devices, a write request including write data that indicates data to be written to the first storage, requested identification information for identifying a record where the write data is to be stored, and a write version that indicates a version of the write data; and
- a storage controller configured to replace the data and its version in the record identified by the requested identification information in the first storage with the requested write data and the requested write version, respectively, if the version in the record identified by the requested identification information is smaller than the requested write version, wherein
- the write request is transmitted from the client device to the server device, a current version of the write request being determined by a determination unit of the client device implemented by computer hardware, the determined current version being stored in a second storage of the client device for respective identification information, wherein
- the determination unit determines the current version of respective identification information on the client device is varied from other client devices by comparing the current versions for respective identification information to the version for respective identification information on other client devices before transmitting the write request; and
- based on the determination that the current version for respective identification on the client device is varied from other client devices, and the write version of the write request to be transmitted is determined by adding a predetermined number to the current version stored in the second storage when the write request is transmitted to the server device, and the current version is replaced with the determined write version in the second storage, and
- a predetermined number added by the determination unit in one of the plurality of client devices and a predetermined number added by the determination unit in another one of the plurality of client devices are mutually different values and relatively prime integers.

8. An information processing method for an information processing system that includes a server device and a plurality of client devices, the server device including a first storage configured to store data and its version in a record indexed by identification information for identifying the record, the method comprising:
- receiving, by the server device, a write request including write data that indicates data to be written to the first storage, requested identification information for identifying a record where the write data is to be stored, and a write version that indicates a version of the write data from a client device of the plurality of client devices;
- replacing, by the server device, the data and its version in the record identified by the requested identification information in the first storage with the requested write data and the requested write version, respectively, if the version in the record identified by the requested identification information is smaller than the requested write version;
- determining, by a determination unit of the client device implemented by computer hardware, a current version;
- storing in a second storage of the client device the current version determined for respective identification information;
- the determination unit determines that the current version for respective identification information on the client device is varied from other client devices by comparing the current version for respective identification information to the version for respective identification information on other client devices before transmitting the write request; and
- based on the determination of the current version for respective identification information on the client device is varied from other client devices, transmitting, by the client device, the write request to the server device, wherein
  - the determining determines the write version of the write request to be transmitted by adding a predetermined number to the current version stored in the second storage when transmitting the write request to the server device, and replaces the current version with the determined write version in the second storage, and
  - a predetermined number added by the determination unit in one of the plurality of devices and a predetermined number added by the determination unit in another one of the plurality of devices are mutually different values and relatively prime integers.

9. A computer program product comprising a non-transitory computer-readable medium containing a program executed by a computer that is connected to a plurality of client devices and includes a first storage configured to store data and its version in a record indexed by identification information for identifying the record, the program causing the computer to execute:
- receiving a write request including write data that indicates data to be written to the first storage, requested identification information for identifying a record where the write data is to be stored, and a write version that indicates a version of the write data from a client device of the plurality of client devices; and
- replacing the data and its version in the record identified by the requested identification information in the first storage with the requested write data and the requested write version, respectively, if the version in the record identified by the requested identification information is smaller than the requested write version, wherein
- the write request is transmitted from the client device to the server device, a current version of the write request being determined by a determination unit of the client device implemented by computer hardware, the determined current version being stored in a second storage of the client device for respective identification information, wherein
- the determination unit determines the current version of respective identification information on the client device is varied from other client devices by comparing the current versions for respective identification information to the version for respective identification information on other client devices before transmitting the write request; and
- based on the determination that the current version for respective identification on the client device is varied from other client devices, the write version of the write request to be transmitted is determined by adding a predetermined number to the current version stored in the second storage when the write request is transmitted to the server device, and the current version is replaced with the determined write version in the second storage, and a predetermined number added by the determination unit in one of the plurality of client devices and a predetermined number added by the determination unit in another one of the plurality of client devices are mutually different values and relatively prime integers.

* * * * *